Patented Nov. 4, 1941

2,261,921

UNITED STATES PATENT OFFICE 2,261,921

TREATMENT OF WASTE MATERIALS

Ernest E. Pittman and Robert Roger Bottoms, Louisville, Ky., assignors to The Girdler Corporation, Louisville, Ky., a corporation of Delaware No Drawing. Application October 31, 1938,
Serial No. 237,973

6 Claims. (Cl. 210—2)

This invention relates broadly to the treatment of all types of organic materials for the purpose of converting the form and character thereof into materials of a useful or desirable nature.

More particularly, this invention relates to the treatment of industrial and trade waste liquids which contain organic constituents having the undesirable property of causing nuisances when such liquids are directed into disposal sources, such as streams, lakes and analogous places, but as will become more apparent as the description proceeds, the scope of the invention is not to be considered as limited solely to this particular type of material.

In some industries such waste materials are directed into streams because there is no known process for correcting their nuisance forming characteristics or because it is economically impractical to dispose of the same otherwise. On the other hand, some industries have been compelled to install expensive and economically impractical means of disposal in order to comply with requirements of health authorities due to the nuisance which their wastes create.

Some waste liquids are objectionable because they contain coloring material which tends to discolor the disposal streams, other liquids are objectionable because they result in toxic conditions in the disposal streams; other liquids are objectionable since they create films upon the surface of water or slime upon the bed of the stream; other liquids are objectionable because of the change in pH of the stream which they create; still other materials are objectionable because they cause odors in the disposal streams and many of these waste liquids are particularly objectionable because of the high oxygen demand which they place upon the disposal streams.

In general these waste liquids will be found to contain carbohydrates such as sugars, starches, cellulose or the like; and/or proteins or proteinaceous material of animal or vegetable origin; and/or fats, waxes, oils or the like; and/or oxygenated compounds such as ethers, alcohols, ketones or the like; and/or organic acids such as amino-, alkyl-, aryl-, carboxylic-, or salts of these acids; and /or lignin; and/or other materials of organic nature. Such compounds will become oxidized in lakes, streams or other such bodies of water; the absorption of oxygen being usually by a biochemical process. The extent of the pollution is usually measured by the amount of oxygen which can be so absorbed and commonly referred to as the biochemical oxygen demand or more commonly by the abbreviation "B. O. D."

The exact proportions and character of the aforementioned organic materials may differ in each specific industrial or trade waste and may even vary from day to day in connection with any given installation but when following the teaching of our invention any such liquid waste material can be so treated a sto produce a residual liquid of very low B. O. D. value having none of the customary nuisance forming characteristics and substantially free of all organic material. Such a residual liquid, therefore, can be directed into the disposal stream without creating a nuisance.

An industrial or trade waste liquid may contain valuable materials which are recoverable; or may contain valuable materials which are non-recoverable either because there is no known process of recovery or because it is not economically feasible to attempt recovery; or may be devoid of any recoverable materials either because of its inherent composition or because it has already passed through a known recovery process.

Furthermore, the term "waste" which connotes a material which has previously passed through a processing step will in certain instances be found to be unduly limited as regards this invention. For example, organic materials which normally contain substantial amounts of water, or which may be diluted with water, or liquid itself from streams or larger bodies of water containing any substantial amount of organic materials may all be treated in accordance herewith. Our process is adaptable to all of these various types of materials and when the term "waste," "waste material" or "liquid waste material" is employed herein with reference to our invention it is to be expressly understood that that same is intended to apply to each of these types of materials.

In carrying out our invention, the process involves as an essential part thereof the treatment of the material so as to convert substantially completely any organic matter which may be therein into compounds which have no high B. O. D. or other objectionable characteristics. In so doing the residual liquid of the material is found to have a very low B. O. D and as a result it may be discharged into disposal sources without being objectionable. In some instances it may be desirable to separate the conversion compounds from the residual liquid and to recover the same as separate by-products and such a practice, therefore, is considered to be within the scope of our invention.

The material to be treated is subjected to high pressures and high temperatures and in any suitable mechanical apparatus. We have found that a temperature of at least 250° C. is necessary in order to insure any substantial conversion of the organic constituents of the material and that preferably this temperature is about 350° C. and not more than 375° C. when treating a material without the aid of auxiliary conversion agents. Various means may be employed in carrying out the process and merely as an example and not by way of limitation we may employ a continuous system or a batch system with the following procedure.

When a continuous system is desired, the material may be continuously introduced in a pump means in which a high pressure commensurate with the high temperature to be employed will be imposed upon the material. The material under this high pressure may be continuously moved through a high temperature zone in which the temperature of the material will be at least equal to the temperature needed for conversion of the organic constituents. It is contemplated that with certain types of materials it will be desirable to retain the material under the high pressure and temperature for a period of time sufficient for the desired conversion to take place and when so desired any suitable means such as a soaking drum of requisite capacity, with or without separate heating means, can be used in connection with the continuous system. After the desired conversion has taken place, the material can then be continuously discharged from the apparatus for subsequent separation of ingredients or for direct delivery into disposal sources. In connection with such a system various mechanical means such as heat exchangers, booster pumps, exhaust turbines and the like can be employed for conserving heat or power requirements without departing from the invention.

In the event that it is desired to employ batch processing of the material any suitable means for introducing the material into a confined vessel may be used, the material may be preheated before being confined, may be pumped into the vessel under a high hydrostatic pressure or may be introduced under atmospheric pressure.

If desired, the high pressure upon the confined material may be developed by direct or indirect application of heat to the material while being confined in such a vessel. For example, when using an autoclave type of batch apparatus the autoclave may be heated to the desired conversion temperature by application of heat to the outside surfaces of the apparatus or the material may be heated within the autoclave as by electrical resistance means or the like. After processing in the batch apparatus for the length of time necessary to secure the desired conversion, the material may be delivered through any suitable pressure and/or heat reducing means and thereafter may be separated for recovery purposes or may be directly delivered into disposal sources.

We have found that in the treatment of certain types of material the presence of an oxide or hydroxide of an alkali or alkali earth metal aids in the conversion of the organic constituents into products which are free of objectionable characteristics. Preferably such auxiliary aids are added in an amount sufficient to neutralize the material under treatment and to combine with all of the carbon content of the organic constituents present in the material. Lime has been found to be a satisfactory aid to the conversion process and appears to act in such a manner in conjunction with the conversion taking place in the organic materials under heat and pressure so as to form calcium salts with the carbon of the organic material, while at the same time at least part of the nitrogen present takes the form of ammonia. If some of the organic matter is present in the form of organic acids, such as lactic or succinic acid as in the case of distillery slop, salts of these acids may be formed by the lime without complete decomposition of the acid radicals. The use of auxiliary agents appears to shorten the time necessary for the desired conversion to take place and may also be useful in lowering the heat and pressure requirements of the process.

As will be obvious, other auxiliary aids serving the same function and not included in the group of alkali or alkali earth materials may be used whenever desired.

As a second type of auxiliary aid we may use various types of oxidizing agents for treating the material before, during or following the conversion of organic constituents under high pressure and temperature. For example, manganese dioxide or other analogous agent may be used in order to insure the desired oxidization of the organic constituents or materials resulting therefrom.

As an illustration of one type of waste material which may be treated in accordance with this invention, the residual waste of a distillery may be cited. An average distillery slop may have a five-day B. O. D. value of about 16,000 with a twenty-day B. O. D. value of about 21,000. When discharged into a stream either with or without prior treatment there is found to be present a substantial amount of organic matter which readily unites with the oxygen of the water, due to more contact therewith or by the action of enzymes, microorganisms or the like. The amount and character of the oxidizable constituents is expressed in terms of B. O. D. (biochemical oxygen demand) and in many places officials consider a five-day B. O. D. value of 200 to be the upper permissible limit and in many cases the limit is much lower. A five-day B. O. D. of 200 means that 200 parts of oxygen per million parts of water (both by weight) is required to support the maximum macteria growth which can occur during a period of five days.

Among other wastes which provide analogous problems may be mentioned cannery wastes such as those resulting from pears, pumpkins or carrots and having five and twenty days B. O. D. values of about 1,630 and 2,900 respectively; tannery wastes having values of about 1,780 and 2,960; wastes of meat packing houses, slaughter houses and the like having values of about 1,300 and 22,500; wastes of wool scouring establishments having values of about 13,000 and 21,800; wastes of flax retting having values of about 2,700 and 5,300; wastes of sulfite liquors from sulfite pulp mills in the manufacture of paper having values of about 8,760 and 16,400. Other types of wastes having high B. O. D. values; coloring matter; odorous matter; toxic matter; and other nuisance forming characteristics, may include milk wastes, molasses waste; dye effluents; starch wastes; coke oven wastes; textile manufacturing waste; tannery wastes; citrus fruit waste; beet and cane sugar wastes; sewage materials; brewery wastes; laundry wastes; and other analogous materials.

The present invention is well adapted for the treatment of each of these materials and the residual liquid can be discharged directly to a sewer or to lakes or streams without danger of objectionable pollution as the B. O. D. will have been reduced to such a low figure as to be negligible or non-objectionable.

Certain of the subject matter of the present application is disclosed in our Patent No. 2,214,909, issued on an application filed on even date herewith.

Having thus described the invention, we claim:

1. In a process for reducing the biochemical oxygen demand of an aqueous liquid medium containing organic material, the step of subjecting said medium to a temperature of about 350° C. while maintaining said medium under high pressure sufficient substantially to prevent vaporization of the medium.

2. In a process for reducing the biochemical oxygen demand of an aqueous liquid medium containing organic material, the step of subjecting said medium to a temperature between 250° C. and 375° C. while subjecting said medium to pressure sufficiently high to maintain the medium in a liquid state.

3. A process for treating an aqueous liquid medium containing organic material to reduce the biochemical oxygen demand thereof, which comprises subjecting said medium to a temperature of at least about 250° C. in the presence of a compound selected from the group consisting of oxides and hydroxides of alkali and alkali earth metals while maintaining said medium under pressure sufficiently high to maintain the medium in a liquid state, for a period of time sufficient to effect conversion of a substantial portion of said organic material into compounds having low biochemical oxygen demand.

4. A process for treating an aqueous liquid medium containing organic material to reduce the biochemical oxygen demand thereof, which comprises subjecting said medium to a temperature of at least about 250° C. in the presence of a compound selected from the group consisting of oxides and hydroxides of alkali and alkali earth metals and an oxidizing agent while mainntaining said medium under pressure sufficiently high to maintain the medium in a liquid state, for a period of time sufficient to effect conversion of a substantial portion of said organic material into compounds having low biochemical oxygen demand.

5. A process for treating an aqueous liquid medium containing organic material to reduce the biochemical oxygen demand thereof, which comprises subjecting said medium to a temperature of at least about 250° C. in the presence of lime while maintaining said medium under pressure sufficiently high to maintain the medium in a liquid state, for a period of time sufficient to effect conversion of a substantial portion of said organic material into compounds having low biochemical oxygen demand.

6. A process for treating an aqueous liquid medium containing organic material to reduce the biochemical oxygen demand thereof, which comprises subjecting said medium to a temperature of at least about 250° C. in the presence of a compound selected from the group consisting of oxides and hydroxides of alkali and alkali earth metals in an amount sufficient to neutralize any acids present and to combine with substantially all of the carbon of the organic compounds while maintaining said medium under pressure sufficiently high to maintain the medium in a liquid state, for a period of time sufficient to effect conversion of a substantial portion of said organic material into compounds having low biochemical oxygen demand.

ERNEST E. PITTMAN.
ROBERT ROGER BOTTOMS.